Patented Oct. 21, 1930

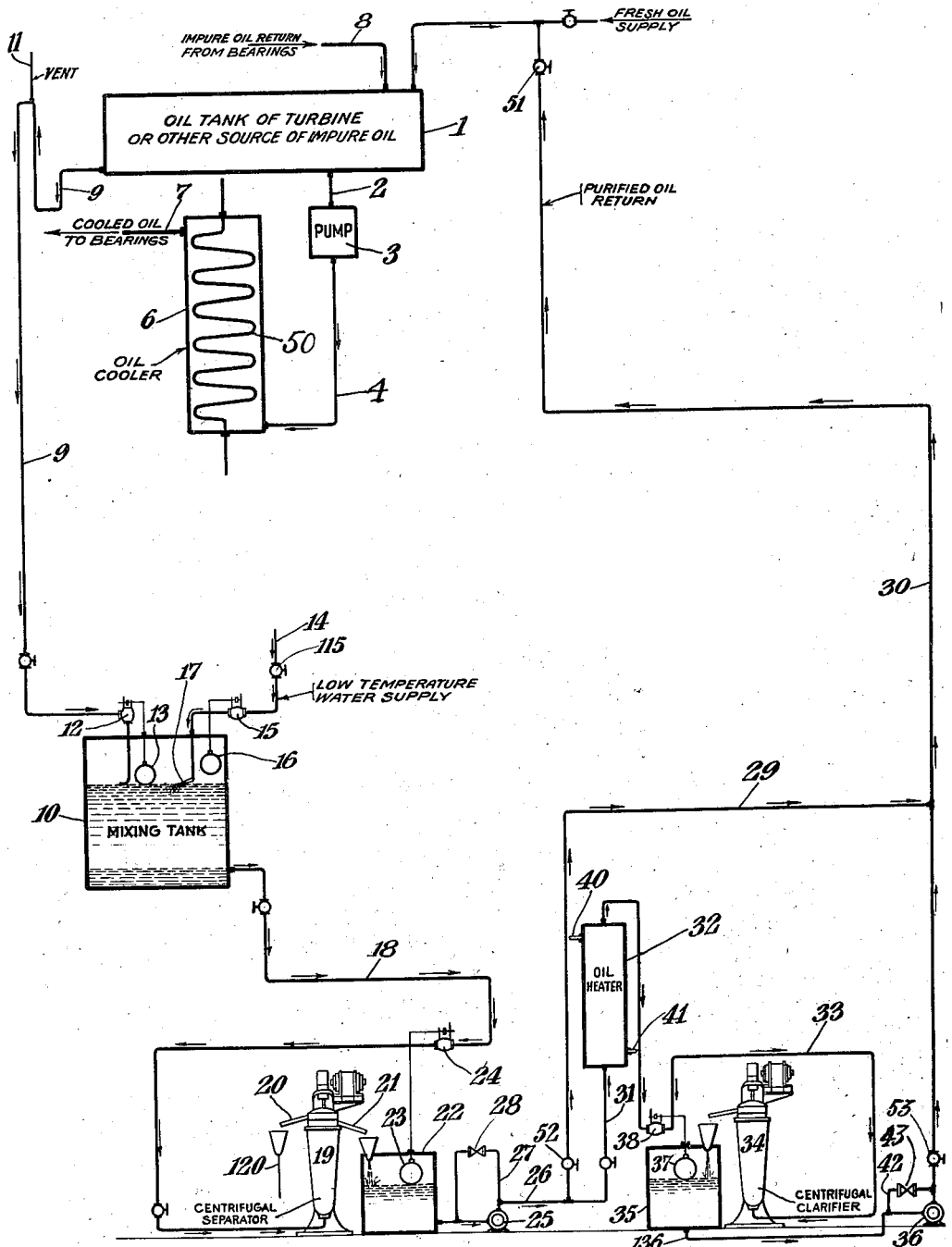

1,778,831

UNITED STATES PATENT OFFICE

LEO D. JONES, OF PHILADELPHIA, PENNSYLVANIA, ASSIGNOR TO THE SHARPLES SPECIALTY COMPANY, OF PHILADELPHIA, PENNSYLVANIA, A CORPORATION OF DELAWARE

OIL-PURIFYING PROCESS

Application filed April 29, 1924. Serial No. 709,764.

My invention relates to processes for the purification of oil and particularly processes for the removal therefrom of sludge and sludge-forming and emulsion-forming impurities.

Oil may contain as impurities solid or semisolid, such as asphaltic, particles and substances that are soluble or colloidally soluble in water or that in the presence of or in combination with other substances, or under certain physical conditions, produce emulsion or sludge. Thus such sludge-producing substances may be decomposition products that in the presence of water will produce emulsion or sludge, and they may be compounds of decomposition products and some metal. And some of such impurities of the oil are soluble in oil of a given temperature but precipitate as sludge when the oil is cooled, such impurities being referred to herein as soluble sludge or oil soluble impurities.

If oil contains impurities that cause precipitation of sludge when the oil is cooled, such sludge will precipitate upon and adhere to and foul a cold surface with which the oil comes into contact, e. g. the cooling surfaces of any device in which the oil is cooled or a cold pipe through which the oil passes.

By removing from the oil the substances produced by decomposition of the oil, the formation of non-lubricating emulsions when the oil is brought into contact with water is prevented, and the formation of sludge upon the cooling of the oil to a point at which sludge would otherwise form is prevented. Also, in the removing of substances produced by decomposition the oil will be freed of particles that are insoluble therein, e. g. asphaltic particles, and of water soluble substances. The removal of decomposition products will thus preserve the lubricating qualities of the oil and prevent fouling and clogging of any system or passage through which the oil is passed.

Oil that has been used for general lubricating purposes, and especially oil that has been used for the lubrication of modern steam turbines, is an example of oil that may contain impurities of the kind and nature above described, because the oil decomposes during such use; and such oil contains sludge that is insoluble in the oil when it is at a temperature below that at which the oil is so hot that it ceases to perform its lubricating function, and such oil contains sludge that is soluble at the temperature attained by the oil during its use for lubricating purposes and which will precipitate in the oil at lower temperatures.

It is an object of my invention to purify oil by the removal therefrom of sludge and emulsion-forming and sludge-forming substances. And a specific object of my invention is to so purify oil that has been used for lubricating purposes by the removal therefrom of products of decomposition and other substances produced or introduced therein during the use of the oil.

While I shall describe the application of my process to the purification of oil that has been used for lubricating purposes I do not intend that my invention shall be limited to the purification of oil that has been so used but intend that it shall be employed in the purification of any oil containing similar impurities.

Oil that has passed through bearings for the purpose of lubricating them is ordinarily at a temperature above that of the surrounding atmosphere, i. e. 120° F. to 170° F. and in addition to the cooling effect of the surrounding atmosphere the oil is ordinarily cooled before it is returned to the bearing surfaces. The decomposition of the oil as it passes through the bearings produces insoluble particles and if water is present, additional sludge and emulsions will be formed in the oil. If the used oil is cooled, additional sludge will be precipitated regardless of whether water is present or not. Thus when the oil that has passed through bearings is passed through a cooling system before being returned to the bearings, it will contain some sludge before it reaches the cooler and within the cooler the reduction of temperature of the oil will cause a precipitation of further sludge, mainly upon the cooling surfaces, with the result that the cooling device and the oil circulating system will become clogged and less and less effective until it becomes inoperative and the oil returned to the bearings will contain non-lubricating substances and will be at so high a temperature that it is ineffective to produce the desired lubrication.

In accordance with my invention, oil that contains sludge and emulsion-forming or sludge-forming substance, e. g. oil that has passed through bearings and is contaminated by products of decomposition, and perhaps other substances due to the presence of such products and the presence of metal taken up from the bearings, is mixed with water, the amount of water and the temperature thereof being such that the mixture of oil and water will be at a temperature low enough to precipitate so much of the contaminating substances that removal of such precipitated substances will maintain the oil at a proper degree of purity. In other words, the resultant mixture of oil and water will ordinarily be at a temperature at least as low as and preferably lower than any temperature that the oil will attain in the system in which the oil is used, e. g. a temperature lower than that attained by the oil in the cooler of a turbine lubricating system. As an illustration I have attained the objects of my invention by bringing such mixture of oil and water to 100° F. when the cooler water used in the cooler of a turbine lubricating system is 80° F. and oil leaving the cooler is 120° F. If cooling water of lower temperature is used and oil leaves the cooler at a lower temperature then I bring such oil and water mixture to correspondingly lower temperature. The added water takes into solution or colloidal solution, other contaminating substances in the oil. The precipitated substances and the cooling and washing water are then removed from the oil leaving it substantially free of the contaminating substances due to its decomposition and the particles of material removed from the bearings that impair its lubricating qualities.

I propose to remove the contaminating substances from the oil by separating the wash water that contains soluble contaminating substances and the precipitate and any other insoluble substances from the oil by passing the mixture of oil and contaminating substances through a centrifugal machine. The water may be mixed with the contaminated oil before or after introduction into the centrifugal and when a mixture of contaminated oil and water is introduced into the centrifugal, additional water may also be introduced into the centrifugal. If water is mixed with the oil before introduction into the centrifugal, a centrifugal bowl of the type shown in Patent No. 1,320,419 to P. T. Sharples can be used. If water is to be mixed with the contaminated oil within the bowl or if a mixture of water and contaminated oil is to be introduced into the bowl and water is to be added to the contents of the bowl, a bowl of the type shown in my Patent No. 1,575,116, March 6, 1926. or a bowl of the type shown in my application Serial No. 682,498 filed December 24, 1923, may be used, or the several features of both of said bowls may be used in combination.

After precipitate that was formed upon the cooling of the oil and other insoluble sludges have been removed therefrom it may be desirable to heat the oil that has been freed of such precipitate in order to facilitate the removal therefrom of traces of contaminating substances, e. g. moisture, that were not removed when the oil was at the low temperature. Thus when a mixture of contaminated oil and wash water, that has been reduced in temperature to effect precipitation of sludge, is passed through a centrifugal bowl of the type shown in Sharples Patent No. 1,320,419, the dam that controls the discharge of the water may be so adjusted as to maintain a large quantity of water within the bowl to avoid loss of oil and the water discharged will be free of oil but will contain dissolved and suspended material and the oil discharged will be moist. The oil may then be heated and passed through a second centrifugal bowl of the same type so adjusted as to maintain a larger proportion of oil within the bowl and the oil discharge will be substantially freed of moisture. Or if a centrifugal bowl of the type shown in my Patent No. 1,575,116 or of the type shown in my application Serial No. 682,498, or a bowl combining the features of both of said types, is used, the mixture of oil and water may be introduced at the bottom of the bowl and hot water may be introduced at the top of the bowl in order to heat the oil that has been freed of solid particles. The heating before the second centrifuging raises the temperature of the oil sufficiently to reduce its viscosity to a point where the separation will be effective, for example 150° F.

To assist in an understanding of my invention there is shown diagrammatically in the single figure of the drawings one form of apparatus whereby my invention may be practised. It is to be understood, however, that the construction shown in the drawings is merely illustrative and is shown for the purpose of assisting in the understanding of my invention and that my invention is not limited to the particular application described nor to the particular apparatus shown and described but is of general application in the purification of oil by means of any suitable apparatus.

In the apparatus shown in the drawing merely for the purpose of illustrating an application of my invention the container 1 is the source of supply of impure oil that is to be purified in the purifying system, and this container may be associated with or formed in the base of some mechanism that is to be lubricated, such as a steam turbine, and it may therefore constitute the source of supply of the lubricating system for the mechanism to be lubricated. To this end oil withdrawn from tank 1 by means of pipe 2 is passed by pump 3 through pipe 4 through a cooler 6 of any suitable design, and the oil then flows through pipe 7 to the bearings that are to be lubricated. Oil returns to tank 1 through pipe 8 in a heated, decomposed and impure condition from the parts that have been lubricated. Oil to be purified is conducted from tank 1 through pipe 9 that leads from a lower level of the tank and extends upwardly to the level at which it is desired to maintain oil in tank 1 and then downwardly to mixing tank 10, being provided at its highest point with a vent 11 that prevents syphoning of oil from tank 1. The end of pipe 9 is provided with a valve 12 that is controlled by a float 13. Water pipe 14 leads into mixing tank 10 and is controlled by a valve 15 that is operated by float 16. The end of water pipe 14 is preferably provided with a nozzle 17 that distributes incoming water and directs it substantially horizontally upon the surface of mixture in tank 10 in such a manner that the mixture in tank 10 is swirled around and agitated and all of the oil is brought under the action of the spray. Pipe 18 conducts mixture from mixing tank 10 to centrifuge 19 which has a spout 20 for the discharging water and impurities into funnelled waste pipe 120 and a spout 21 for the discharge of oil into collecting tank 22. In tank 22 is positioned float 23 that controls valve 24 located in mixture supply pipe 18. The supply of mixture to centrifuge 19 is thus dependent upon the amount of oil in tank 22. Pump 25 draws oil from tank 22 and discharges it into pipe 26, pump 25 being provided with a return by-pass 27 containing a relief valve 28. Oil from pipe 26 may be conducted through pipe 29 directly into pipe 30 that leads back into tank 1, or oil from pipe 26 may be passed through pipe 31 and through heater 32 and then by means of pipe 33 into centrifugal clarifier 34. In such case oil discharged from clarifier 34 is collected in tank 35 and passed through pipe 136 by means of pump 36 into pipe 30 that leads to tank 1. A float 37 in tank 35 operates valve 38 that controls flow of oil through pipe 33 to clarifier 34. Pump 36 may be provided with a by-pass 42 containing a relief valve 43.

Float 16 that controls flow of water into tank 10 is preferably at a higher level than float 13 that controls flow of oil into tank 10. This insures that an ample quantity of water will be supplied to the oil and insures that an additional quantity of water will be added after the oil supply is cut off by float 13, such an extra quantity of water providing an initial supply of water to prime centrifuge 19 when operation is resumed. The supply of water to tank 10 is ordinarily controlled by valve 115 by setting that valve to deliver a desired quantity of water uniformly and that supply is only reduced or discontinued by the operation of valve 15 by float 16 when flow of mixture from tank 10 is reduced or discontinued and the liquid level in tank 10 rises and operates valve 15. Heat may be supplied to heater 32 in any desired manner as by introducing a heating fluid through pipe 40 and withdrawing it through pipe 41. Oil in cooler 6 may be cooled in any desired manner as by means of a coil 50 through which fluid of low temperature is circulated.

If the amount of purified oil returning to tank 1 through pipe 30 is regulated by adjustment of valve 51 or valves 52 or 53 the flow of liquid through the purifying system is automatically controlled. If more oil is pumped by pump 36 than passes through valve 51 the excess will circulate through by-pass 42. If more oil is pumped by pump 25 than will flow through valve 51 or valve 38 the excess will circulate through by-pass 27. Also supply to each centrifugal machine is determined by the level of liquid in the container that receives the oil discharged from each centrifugal machine.

The flow of oil and water to the mixing tank is determined by the level therein. Thus by adjustment of valve 51 the rate of flow through the purifying system may be determined and the supply of liquid to the various elements of the apparatus will be automatically regulated by such a single control.

From the foregoing it will be apparent that by the practice of my invention products of decomposition that have been produced in oil during its use for lubricating purposes, as well as other contaminating substances derived from such products of decomposition, will be removed from the oil by cooling and washing the oil in order to precipitate certain of the contaminating substances and to absorb soluble contaminating substances. It will also be apparent that by the subsequent removal of the precipitated substances and the wash water, the oil will be restored to a condition in which it will effectively perform its lubricating function.

While I have referred to certain details of my process in order to fully disclose the same I do not intend that my invention shall be limited thereto but that it shall be susceptible of such modifications and variations as fall within the hereunto appended claims.

What I claim and desire to secure by Letters Patent is:

1. The process of purifying used oil containing impurities, of the character of those produced in oil used in contact with steam for the lubrication of steam turbines, including sludge, water soluble impurities and impurities which are soluble in the oil at higher temperatures and precipitate in the oil at temperatures to which it is cooled preparatory to re-use, which comprises precipitating oil soluble impurities as sluge by adding water and lowering the temperature of the mixture to a point at which precipitation of sluge occurs, and centrifugally separating water and undissolved impurities including sludge from the oil.

2. The process of purifying used oil containing impurities, of the character of those produced in oil used in contact with steam for the lubrication of steam turbines, including sludge, water soluble impurities and impurities which are soluble in the oil at higher temperatures and precipitate in the oil at temperatures to which it is cooled preparatory to re-use, which comprises precipitating oil soluble impurities as sludge by adding water of sufficiently low temperature to bring the temperature of the resulting mixture to a point at which precipitation of sludge occurs, and separating water and undissolved impurities from the oil.

3. The process of purifying used oil containing impurities, of the character of those produced in oil used in contact with steam for the lubrication of steam turbines, including sludge, water soluble impurities and impurities which are soluble in the oil at higher temperatures and precipitate in the oil at temperatures to which it is cooled preparatory to re-use, which comprises precipitating oil soluble impurities as sludge by adding water and reducing the temperature of the mixture to a point at which precipitation of sludge occurs, separating water and undissolved impurities including sludge from the oil, heating the oil, and centrifugally treating the oil while heated and thereby removing remaining impurities.

4. In the purification of the lubricating oil of a lubricating system in which the oil is continuously circulating and is cooled preparatory to its return to the parts to be lubricated and becomes contaminated with impurities of the character of those produced in oil used in contact with steam for lubrication of steam turbines, including impurities that are soluble in the oil at temperatures to which it is raised in the lubrication of said parts and that precipitate in the oil at temperatures to which it is cooled preparatory to its return to said parts, the process comprising withdrawing oil from the system, bringing the withdrawn oil into direct contact with water and reducing the temperature of the resulting mixture of oil and water to a temperature as low as the temperature to which oil in the lubricating system is to be cooled preparatory to its return to said parts, centrifugally separating the oil from water and water-soluble impurities and impurities that are not in solution in the mixture, and returning the purified oil to the system.

5. In the purification of the lubricating oil of a lubricating system in which the oil is continuously circulating and is cooled preparatory to its return to parts to be lubricated and in which impurities are produced in the oil that are of the character of those produced in oil used in contact with steam for the lubrication of steam turbines and that are soluble in the oil at temperatures to which it is raised in the lubrication of said parts and that precipitate in the oil at temperatures below the maximum temperature of the system, the process comprising withdrawing oil from the system, precipitating from the oil impurities soluble in the oil at the maximum temperature thereof in the system by cooling the oil in direct contact with water, centrifugally separating the oil from water and water-soluble impurities and impurities that are not in solution in the mixture, and returning the purified oil to the system.

6. In the purification of the lubricating oil of a lubricating system in which the oil is continuously circulating and is cooled preparatory to its return to parts to be lubricated and in which impurities are produced in the oil that are of the character of those produced in oil used in contact with steam for the lubrication of steam turbines and that are soluble in the oil at temperatures to which it is raised in the lubrication of said parts and that precipitate in the oil at temperatures below the maximum temperature of the system, the process comprising withdrawing oil from the system, precipitating from the oil impurities soluble in the oil at the maximum temperature thereof in the system by adding to the withdrawn oil water of sufficiently low temperature and in sufficient quantity to bring the temperature of the resulting mixture to a point at which such precipitation occurs, centrifugally separating the oil from water and water-soluble impurities and impurities that are not in solution in the mixture, and returning the purified oil to the system.

In testimony whereof, I have signed my name to this specification.

LEO D. JONES.